United States Patent
Albert et al.

(10) Patent No.: US 8,616,245 B2
(45) Date of Patent: Dec. 31, 2013

(54) PIPE INTERIOR COATINGS

(75) Inventors: Richard C. Albert, Landenberg, PA (US); Craig King Hennessey, Avondale, OH (US); Laurence Waino McKeen, Sewell, NJ (US); Jurgen F. A. Hofmans, Puurs (BE); Raf Moens, Mechelen (BE)

(73) Assignee: E I du Pont de Nemours and Company, Wilmington, DE (US)

( * ) Notice: Subject to any disclaimer, the term of this patent is extended or adjusted under 35 U.S.C. 154(b) by 1133 days.

(21) Appl. No.: 12/200,980

(22) Filed: Aug. 29, 2008

(65) Prior Publication Data
US 2009/0078328 A1    Mar. 26, 2009

Related U.S. Application Data

(60) Provisional application No. 60/994,900, filed on Sep. 21, 2007.

(51) Int. Cl.
  *B29C 47/00*    (2006.01)
  *B29D 22/00*    (2006.01)
  *G05D 7/01*    (2006.01)

(52) U.S. Cl.
  USPC ......... 138/146; 138/145; 138/141; 428/36.91

(58) Field of Classification Search
  USPC ....... 138/140, 145, 146, 141, DIG. 3, DIG. 6; 428/36.9, 36.91; 285/45, 55
  See application file for complete search history.

(56) References Cited

U.S. PATENT DOCUMENTS

| | | | |
|---|---|---|---|
| 3,314,450 A * | 4/1967 | Doering et al. | 138/146 |
| 4,029,868 A | 6/1977 | Carlson | |
| 4,319,610 A * | 3/1982 | Eckner | 138/131 |
| 5,478,651 A * | 12/1995 | Tannenbaum | 428/422 |
| 5,677,404 A | 10/1997 | Blair | |
| 6,276,400 B1 * | 8/2001 | Jackson et al. | 138/143 |
| 6,541,588 B1 | 4/2003 | Kaulbach et al. | |
| 6,592,977 B2 | 7/2003 | Thomas et al. | |
| 6,761,964 B2 | 7/2004 | Tannenbaum | |
| 6,863,974 B2 * | 3/2005 | Shah et al. | 428/325 |
| 2005/0173012 A1 * | 8/2005 | McKeen | 138/146 |
| 2006/0017281 A1 | 1/2006 | McKeen | |
| 2006/0108110 A1 | 5/2006 | McKeen | |

FOREIGN PATENT DOCUMENTS

| | | |
|---|---|---|
| EP | 1283101 A | 2/2003 |
| WO | 2005/100843 A | 10/2005 |

* cited by examiner

*Primary Examiner* — Len Tran
*Assistant Examiner* — Justin Jonaitis

(57) ABSTRACT

Pipe useful for downhole and transport of hydrocarbon fuel such as oil and/or natural gas is provided that has a non-stick coating adhered to the pipe interior surface, said coating being at least about 50 μm thick and comprising at least two layers constituting an inner layer and an outer layer adhered to one another, each said layers containing polymer binder and fluoropolymer and being at least about 15 μm thick, the weight proportion of said polymer binder to said fluoropolymer in said inner layer and in said outer layer but being effective to maintain adhesion between said layers during pressurization and decompression upon said non-stick coating being exposed to the Autoclave Test and the proportion of said fluoropolymer in said inner layer and said outer layer being effective to protect said interior surface during exposure of said non-stick coating to the Acid Soak Test.

20 Claims, 1 Drawing Sheet

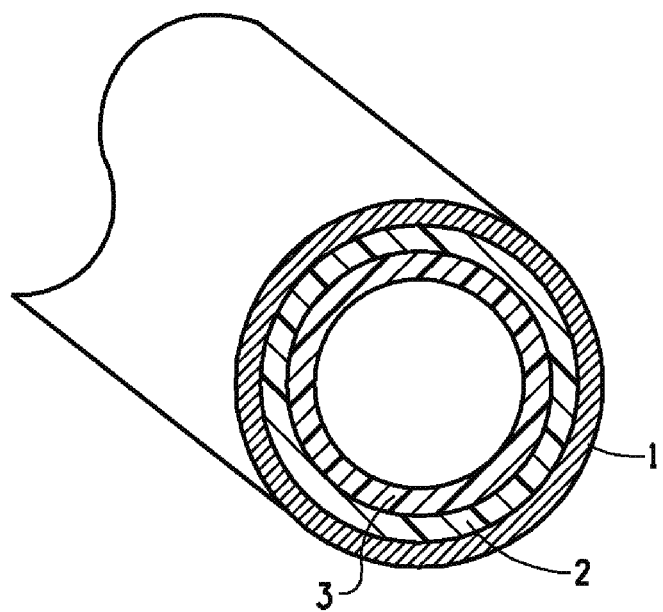

ID_COATINGS

BACKGROUND OF THE INVENTION

1. Field of the invention

This invention relates to pipes that convey hydrocarbon fuel from deposits within the earth and more particularly to coatings for the interior surface of such pipes.

2. Description of Related Art

U.S. Patent Publication 2006/0017281 discloses the corrosive environment to which oil pipes are exposed, especially in the conveying of oil from underground deposits in the earth. Such oil well pipes also face the problem of plugging with asphaltenes, paraffin waxes and scale present in the oil. This Patent Publication solves these problems with a lining for the interior surface of the oil pipe, wherein the exposed surface of the lining comprises perfluoropolymer. Typically, the lining is composed of a primer layer adhered to the interior surface of the pipe and an overcoat adhered to the primer, perfluoropolymer preferably being in both layers, so that upon baking, the perfluoropolymer in the overcoat melt bonds to the perfluoropolymer in the primer layer [0010]. The primer layer also contains heat-resistant polymer binder which enables the primer layer to adhere to the oil pipe interior surface [0030]. The overcoat is essentially free of any ingredient other than the perfluoropolymer to provide the best non-stick surface [0045]. The lining in the form of coatings on steel substrates are tested for paraffin, asphaltene, and scale depositions, adhesion, and salt water permeation. The salt water permeation test is carried out in an autoclave containing stratified contact fluids, and is heated at 251° F. (122° C.) and maintained at 1026 psi (70.8 MPa) for 29 days. At the conclusion of the autoclave exposure, the autoclave is cooled to 104° F. (40° C.) over a period of several hours, and then the remaining autoclave pressure is released at a rate of about 100/psi/min, after which the impedance of the coating is tested. Reduction in impedance indicates permeability for the coating.

Environmental conditions to which the interior of pipes, i.e. downhole pipe that conveys hydrocarbon fuel from deposits in the earth vary geographically. The expression "pipe" includes tubes and tubing, these sometimes being an alternate expression for pipe. In this regard, downhole pipe may be called tubes, while pipe for surface conveying of hydrocarbon fuel, including undersea conveying, is usually called pipe. The term "pipe" also includes casing, that is a tubular structure that supports a hole and keeps the surrounding ground from collapsing. Hydrocarbon fuel includes liquid fuel, most notably oil, and liquid/gas fuel mixtures, most notably, unrefined natural gas, and mixtures thereof present in the same deposit. The environmental conditions at some drilling locations are much more severe than at other locations. These more severe conditions can be present both in the downhole pipe and pipe used to convey the fuel to storage or refining, i.e. fuel flow pipe.

To address these more severe conditions, more stringent tests have been proposed for coatings to be used on the interior surface of such pipe, to qualify the coating for testing in actual service. These tests are described under Test Methods herein as the Autoclave Test and the Acid Soak Test. The Acid Soak Test tests the impermeability of the coating to concentrated acid and requires the coating to be rather thick, i.e. at least about 50 μm in order to protect the substrate from corrosion. The Autoclave Test is similar to the autoclave test disclosed in U.S. Patent Publication 2006/0017281, with two major differences. First, the pressurization is much greater and second, a rapid rather than gradual decompression is used. The higher pressurization forces the test fluids present in the autoclave to penetrate into the coating, and the rapid decompression, results in the penetrated (absorbed) fluids (vapor) rapidly exiting the coating. A non-stick coating based on fluoropolymer as providing the non-stick character needed to avoid paraffin, asphaltene, and scale depositions inevitably requires the coating to be multilayer, at least one inner layer for providing adhesion to the substrate and at least one outer layer for providing the non-stick character to the coating. One or more of the test fluids penetrates all these layers during the Autoclave Test. The problem arises that the rapid exiting of the absorbed vapor during rapid decompression tends to cause blistering arising from the trapping of vapor within the coating, i.e. the absorbed vapor is unable to rapidly permeate out of the coating. Typically, the blistering occurs within an inner layer or at the interface between the inner layer and the outer layer. This blistering, depending on its severity, i.e. blister size, represents points of potential corrosive attack and coating failure in actual service using the coated pipe. The greater the coating thickness, especially with regard to the outer layer, the more difficult it is for the vapor to escape from the coating, leading to blistering from vapor entrapment. The Acid Soak Test also has the ability to cause blistering in the non-stick coating, and both Tests can attack the adhesion between layers and between the non-stick coating and the substrate.

The need to pass both the Autoclave Test and the Acid Soak Test presents the problem of conflicting requirements for fluoropolymer based non-stick coatings. The coating needs to be thick to stop corrosion in the Acid Soak Test, but needs to be thin in order to avoid blistering of the coating in the Autoclave Test. Reasonable adhesion of the coating to the interior surface of the pipe must also be maintained during both Tests.

SUMMARY OF THE INVENTION

The present invention solves this problem by providing pipe having a non-stick coating adhered to its interior surface, said coating being at least about 50 μm thick and comprising at least two layers constituting an inner layer and an outer layer adhered to one another, each said layers containing polymer binder and fluoropolymer and being at least about 15 μm thick, the weight ratios of said polymer binder to said fluoropolymer in said inner layer and in said outer layer and being effective to enable said non-stick coating to pass both the Autoclave Test and the Acid Soak Test, Level 1, described under Test Methods herein. These tests provide a laboratory simulation of conditions encountered in use of the pipe as oil well pipe, so that passage of these Tests is indicative of successful performance by the coating in actual usage as a coating on the interior surface of oil well pipe.

The blister and adhesion ratings for both Tests that constitute the Level 1 passing of these tests are also described under Test Methods. The Test conditions practiced to obtain Level 1 ratings are very severe. Preferably, the non-stick coating passes these Tests under Level 2 conditions, which are more severe that the Level 1 conditions, and the blister and adhesion ratings that constitute passing Level 2 are also disclosed under Test Methods.

The high coating thickness made up of the coating thicknesses of the inner layer and outer layer increases the difficulty to pass the Autoclave and Acid Soak Tests. In this regard, on the one hand, the coating needs to resist permeation by the Test Acid under the condition(s) of the Acid Soak Test. On the other hand, the coating needs to be permeable to the Test Vapor absorbed by the coating in the Autoclave Test, so that the Vapor can escape from the coating during the rapid decompression of the Test without blistering the coating as would occur if the coating entrapped the absorbed Test Vapor. The polymer binder/fluoropolymer weight ratio in each of the inner and outer layers of the coating are selected to be effective at the layer thicknesses being used to enable these conflicting requirements to be successfully achieved.

Generally the fluoropolymer content in wt % is greater in the outer layer than in the inner layer. This may be accomplished by the the weight ratio of polymer binder to fluoropolymer in the inner layer being greater than the weight ratio of polymer binder to fluoropolymer in the outer layer, which is one way for the the amount of fluoropolymer present in the outer layer being greater than the amount present in the inner layer. The greater fluoropolymer content in the outer layer may also be achieved by the inner layer containing other ingredients, which has the effect of reducing the fluoropolymer content in the inner layer. Typically, the weight of the fluoropolymer in the outer layer is at least about 20% greater than the weight of the fluoropolymer in the inner layer, more preferably, at least 40% greater. At the same time, the weight of the polymer binder is the outer layer is within about 20% of the weight of the polymer binder in the inner layer. Also typically, the amount of the polymer binder in the inner layer is greater than the amount thereof present in the outer layer, but is still present in a substantial amount in the outer layer, i.e. at least about 80 wt % of the amount of polymer binder present in the inner layer. According to one embodiment, the weight % of the polymer binder and the fluoropolymer in said outer layer is from about 60:40 to about 15:85, to total 100% of the combined weight of polymer binder and fluoropolymer. According to another embodiment, the weight % of the polymer binder and fluoropolymer in the outer layer is from about 40:60 to about 15:85, to total 100% of the combined weight of these ingredients.

The high, usually greater fluoropolymer content in the outer layer together with relatively high outer layer thickness are necessary for good performance in the Acid Soak test as well as reasonably good non-stick property. The fluoropolymer content of the outer layer, however, cannot be too high, because the rapid decompression accompanying the Autoclave Test causes sever blistering and even delamination of the outer layer, thereby failing the Autoclave Test. This poor result is not improved by decreasing the outer layer thickness from 15 µm, and such layer thickness reduction is accompanied by poor Acid Soak Test performance. The preferred minimum thickness of the outer layer is about 20 µm, and the actual outer layer thickness above this thickness and high fluoropolymer content are established so as to be effective to pass the Autoclave Test as well as the Acid Soak Test, Level 1. As the outer layer thickness increases from 15 µm or 20 µm, it is desirable that the weight ratio of polymer binder to fluoropolymer in the outer layer increase so as to obtain these desirable Test results. The increased thickness of the outer layer required to pass the Acid Soak Test causes increasing difficulty for passing of the Autoclave Test by presenting a barrier to the escape of the absorbed Test Vapor from the inner layer arising from the Autoclave Test. In this regard, it is important that the outer layer coating composition and its method of application provide pin-hole free and crack-free coating when the coating is baked.

The inner layer must also be relatively thick, preferably at least 20 µm, to provide good performance in both Tests, especially to resist blistering in the Autoclave Test. Just as the absorbed Test Vapor needs to rapidly escape from the outer layer during the Autoclave Test decompression, so must the absorbed vapor escape from the inner layer, passing through the outer layer, as well. The inner layer composition is formulated to provide the necessary interlayer adhesion and to promote vapor escape so that the non-stick coating passes both Tests. In this regard, the function of the polymer binder in the inner layer is to achieve sufficient adhesion with the outer layer such that blistering between layers does not occur in the Autoclave Test. There are no metal flakes present in the inner layer or the outer layer, to which the polymer binder in each layer might serve as a compatibilizing function. According to one embodiment, the weight % of the polymer binder and the fluoropolymer in the inner layer is from about 80:20 to about 25:75 to total 100% of the combined weight of polymer binder and fluoropolymer. To facilitate the vapor escape from the inner layer, this layer also preferably contains a particulate agent that is effective to improve vapor escape, i.e. is effective to improve performance in the Autoclave Test. This particulate agent is preferably small in particle size and is preferably present in the amount of at least 3 wt % based on the combined weight of agent, polymer binder and fluoropolymer in the inner layer. An amount greater than about 30 wt % is not desirable in that Tests performance tends to deteriorate. Preferably, the particulate agent constitutes about 3-30 wt %, preferably about 5 to 25 wt % of the combined weight of agent, polymer binder, and fluoropolymer in the inner layer. When the particulate agent is present in the inner layer, its presence is generally at the expense of (as a replacement for) the fluoropolymer in the inner layer, since a substantial amount of polymer binder must be present to achieve adhesion and resistance to blistering during the Autoclave and Acid Soak Tests. Thus, the preferred amount of particulate agent can be expressed in amount relative to the fluoropolymer content of the inner layer. In this regard, the inner layer preferably contains at least about 25 wt % of the weight of the particulate agent based on the weight of the fluoropolymer in the inner layer.

Preferably the polymer binder constitutes at least about 15 wt % of the inner layer and the outer layer, more preferably at least about 20 wt %, and most preferably, at least 25 wt %, these preferences being independently applicable to the inner and outer layers, i.e. the polymer binder wt % in the inner layer can be at least 25 wt %, while the wt % polymer binder in the outer layer can be at least 20 wt %.

According to one embodiment of the present invention, the weight proportion of polymer binder to fluoropolymer in the inner layer is effective to adhere the inner layer to the interior surface of the pipe. According to a preferred embodiment of the present invention, a primer layer is present between said surface and said inner layer and is adhered to both the interior surface of the pipe and the inner layer. When the primer layer is present, the thickness and compositional description of the inner and outer layers above apply to this three layer embodiment, primer layer, inner layer, outer layer, as well.

In the preferred embodiment of having a primer layer present in the coating, the primer layer comprises polymer binder to accomplish adhesion to the pipe interior surface. The presence of polymer binder in the inner layer in a substantial (effective) amount enables the primer layer to adhere both to the pipe interior surface and the inner layer. The primer layer may also comprise one or more of fluoropolymer and inorganic film hardener. Preferably inorganic film hardener is present in an amount and average particle size that is effective to increase the abrasion resistance of the non-stick coating. The presence of the primer layer, in addition to providing the required adhesion, provides a layer into which increased coating abrasion resistance for the coating can be provided without preventing the coating from passing both the Autoclave Test and the Acid Soak Test. The primer layer is also relatively thick to promote passage of the Autoclave Test, preferably at least about 10 μm, more preferably at least about 12 μm. Preferably, the thickness of the entire non-stick coating, without primer layer is at least about 50 μm and with primer layer, at least about 60 μm. Preferably the polymer binder content of the primer layer is at least about 30 wt %, more preferably at least about 40 wt %, and most preferably at least about 50 wt %.

Another embodiment of the present invention is the process for forming a non-stick coating adhered to the interior surface of pipe that is capable of passing both the Autoclave Test and the Acid Soak Test, Level 1, comprising optionally forming a primer layer on said interior surface, sequentially forming at least two layers on said primer layer if present or to said interior surface if said primer layer is not present, said two layers constituting an inner layer and an outer layer adhered to one another, each said inner and outer layers containing polymer binder and fluoropolymer and preferably being at least about 15 μm micrometers thick, more preferably, at least about 20 μm, the weight ratio of said polymer binder to said fluoropolymer in said inner layer and said outer layer and being effective to enable the passing of the above-mentioned Tests (Level 1). The preferred minimum thickness of the non-stick coating is as stated in the preceding paragraph. Preferably, this process includes the step of forming the primer layer on the interior surface of the pipe to adhere (indirectly) the inner layer to the pipe interior surface.

In each of the product (pipe) and process embodiments of the invention, it is preferred that the weight ratio of the polymer binder to fluoropolymer in the inner layer is greater than the weight ratio of polymer binder to fluoropolymer in the outer layer. The details of product and process embodiments described above are applicable to this preferred embodiment, product and process, and the further details disclosed Linder the Detailed Description are applicable to all these embodiments.

In all these embodiments, the combination of inner and outer coatings as described above, optionally with the presence of the primer layer, constitute the coating system of the present invention.

BRIEF DESCRIPTION OF THE DRAWINGS

FIG. 1 shows a cross-section view of a pipe according to the present invention.

DETAILED DESCRIPTION OF THE INVENTION

The hydrocarbon fuel conveying pipes used according to the present invention, whether downhole or surface conveying, are conventional, and preferably made from metal, such as steel. According to the present invention, the pipes do not have to be rigid but rather could be a flexible hose, which has, for example, subsea utility as oil or gas flow pipe. The composition of the pipes is selected depending on the location of the well and its attendant environmental condition and the particular use of the pipe. In any event, the oil pipes are large. Inner diameters of at least 2 in (5.08 cm), 2⅜ in (6.03 cm) and 3 in (7.6 cm) and larger, and lengths of at least 10 ft (3 m), or even 20 ft (6.1 m) are quite common. Down-hole pipes can be coated in accordance with the present invention are often characterized by outer diameter and the present invention is applicable to such large size pipes that have an outer diameter of at least 3.5 in (8.9 cm), or at least 4.5 in (11.4 cm), or at least 5.5 in (14 cm) and even at least 7 in (17.8 cm). These outer diameters correspond to the following inner diameters, respectively: 2.867 to 2.959 in (7.282 to 7.516 cm), 3.833 to 3.876 in (9.736 to 9.845 cm), and 4.653 to 4.715 in (11.819 to 11.976 cm). Pipes having lengths mentioned above and even as long as 30 to 40 feet (9.1 to 12.2 m), such as are used in down-hole pipe, can also be coated in accordance with the present invention. Another pipe utility that benefits from the coating system of the present invention is that which is used for salt water injection into fuel deposits within the earth, as a way to increase the fuel output of the deposit. This salt water is highly corrosive, causing pipe failure wherever the interior protective coating is missing. When epoxy coating is used, just the assembling of the pipe tends to cause the brittle epoxy coating to chip and crack at the joints where lengths of the pipe are screwed together. This chipping and cracking becomes the location(s) for rapid corrosion of the resultant exposed areas of the pipe by the injected salt water. It has been found that the coating system of the present invention maintains both its adhesion to the pipe interior and its integrity during pipe assembly, so that the pipe itself, including its locations of interconnection, is protected from the salt water by the coating system. Prior to forming the non-stick coating on the interior surface of the pipe, the interior surface is preferably cleaned and roughened such as described in U.S. 2006/0017281 at [0017] and [0018].

With respect to the components of the layers making up the coating, the polymer binder, sometimes called adhesion promoter, is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a metal substrate. The binder is generally non-fluorine containing and yet adheres to the fluoropolymer. Examples of thermally stable polymers (polymer binders) include polyamideimide (PAI), polyimide (PI), polyphenylene sulfide (PPS), polyether sulfone (PES), polyarylene-etherketone etc. These polymers are also fluorine-free and are thermoplastic. All of these resins are thermally stable at a temperature of at least 140° C. Polyethersulfone is an amorphous polymer having a glass transition temperature of about 230° C. and a sustained temperature service of about 170° C. to 190° C. Polyamideimide is thermally stable at temperatures of at least 250° C. and melts at temperatures of at least 290° C. Polyphenylene sulfide melts at 285° C. Polyarylene-etherketones are thermally stable at least 250° C. and melt at temperatures of at least 300° C. The polymer binder used in the primer layer, inner layer and outer layer can be the same or different, but should be compatible enough from layer to layer that the required adhesion is maintained. The preferred polymer binder is one which is soluble in organic solvent which is used as the liquid medium for applying the coating composition to the substrate or preceding layer as the case may be. PAI and PES are both soluble in such organic solvent and exhibit high adhesion to the pipe interior surface and successive coating layers. A mixture of these polymer binders is preferred, wherein the weight ratio of PAI to PES is about 1:10 to 10:1.

With respect to the fluoropolymer component, the fluoropolymer used in the present invention is preferably a copolymer of tetrafluoroethylene (TFE) and hexafluoropropylene (HFP), typically referred to as FEP. In these copolymers, the HFP content is typically about 6-17 wt %, preferably 9-17 wt % (calculated from HFPI×3.2). HFPI is the ratio of infrared radiation (IR) absorbances at specified IR wavelengths as disclosed in U.S. Statutory Invention Registration H130. Preferably, the TFE/HFP copolymer includes a small amount of additional comonomer to improve properties. The preferred TFE/HFP copolymer is TFE/HFP/perfluoro(alkyl vinyl ether) (PAVE), wherein the alkyl group contains 1 to 4 carbon atoms. Preferred PAVE monomers are perfluoro(ethyl vinyl ether) (PEVE) and perfluoro(propyl vinyl ether) (PPVE). Preferred TFE/HFP copolymers containing the additional comonomer have an HFP content of about 6-17 wt %, preferably 9-17 wt % and PAVE content, preferably PEVE, of about 0.2 to 3 wt %, with the remainder of the copolymer being TFE to total 100 wt % of the copolymer. Examples of FEP compositions are those disclosed in U.S. Pat. No. 4,029,868 (Carlson), U.S. Pat. No. 5,677,404 (Blair), and U.S. Pat. No. 6,541,588 (Kaulbach et al.) and in U.S. Statutory Invention Registration H130. The FEP is partially crystalline, that is, it is not an elastomer. By partially crystalline is meant that the polymers have some crystallinity and are characterized by a detectable melting point measured according to ASTM D 3418, and a melting endotherm of at least about 3 J/g.

Other fluoropolymers can be used, i.e. polymers containing at least 35 wt % fluorine, that are melt fabricable so as to be melt flowable, but FEP is preferred because of its high non-stick quality and low melting point, facilitating the baking of the coating applied to the oil pipe interior surface. FEP is a perfluoropolymer. If other fluoropolymer is used, it too is preferably a perfluoropolymers. Such other perfluoropolymers include copolymers of tetrafluoroethylene (TFE) and perfluoro(alkyl vinyl ether) (PAVE), commonly known as PFA, and in certain cases MFA. PAVE monomers include perfluoro(ethyl vinyl ether) (PEVE), perfluoro(methyl vinyl ether) (PVE), and perfluoro(propyl vinyl ether) (PPVE). TFE/PEVE is a preferred PFA, and MFA is TFE/PPVE/PMVE copolymer. The melt flowability of the fluoropolymer used in the present invention can be characterized by melt flow rate, i.e. the quantity of molten polymer being forced though an orifice under a given load in 10 min, using the equipment described in ASTM D 1238-94a, using test conditions standard for the particular fluoropolymer, e.g. ASTM D 2116-91 a for FEP and ASTM D 3307-93 for PFA. The melt flow rate (MFR) of the fluoropolymers used in the present invention is preferably in the range of about 1 g/10 min to about 50 g/10, preferably at least 20 g/10 min, and more preferably at least 25 g/10 min. The fluoropolymer used in the inner layer and outer layer should preferably be the same so as to promote adhesion between these layers, i.e. if FEP is used in the inner layer, then FEP is also preferably used in the outer layer. The same is true for the fluoropolymer used in the primer layer.

At least 80 wt % of the fluoropolymer present in the inner layer and outer layer used in the coating of the present invention is preferably FEP, and preferably the FEP constitutes at 90 wt % and more preferably at least 95 wt % or all of the fluoropolymer present in these layers. The same fluoropolymer compositional relationship is desired if a different melt-fabricable perfluoropolymer is used in place of the FEP. This avoids stratification between the polymer binder and fluoropolymer during drying and baking of the coating, i.e. avoids the polymer binder concentrating at one surface of the coating and the fluoropolymer concentrating at the opposite surface. Avoidance of stratification is desirable so as to maintain adhesion between layers during the Tests. If fluoropolymer is present in the primer layer in a small amount, e.g. the fluoropolymer/polymer binder weight ratio is less than 1:4, stratification is not a problem because of the presence of the large amount of polymer binder in both the primer layer and the inner layer. As the proportion of fluoropolymer is increased in the primer layer composition, the fluoropolymer is selected to as to be compatible with the fluoropolymer used in the adjacent layer, i.e. the inner layer.

The inner layer preferably contains a particulate agent for promoting the escape of absorbed vapor during the rapid decompression in the Autoclave Test. The particulate agent is inorganic, thermally stable, and preferably non-metallic and has a particle size that disrupts the film-forming polymer binder/fluoropolymer mixture sufficiently to enable this escape to occur. Such particle size is an average of about 0.5 to 5 μm. In addition to particle size, the agent is present in an effective amount to improve the escape of absorbed vapor. The particulate agent does not make the inner layer porous, because this would detract from performance in the Acid Soak Test. Examples of particulate agent include pigment and inorganic film hardener as will be further described below. Suitable pigments serving as particulate agents include mica, zeolites such as ultramarine blue, aluminum oxide, iron oxide, chromium oxide, titanates, cobalt blue and other inorganic pigments.

The primer layer, if present, contains polymer binder selected from those describe above. This layer may also contain one or more inorganic film hardeners selected from those described above and in the amounts described above. Typically, the average particle size of the inorganic film hardener will not exceed about 45 μm, and the maximum amounts of polymer binder and inorganic film hardener will not exceed, about 85 wt % and about 40 wt %, respectively, based on the combined weight of polymer binder and inorganic film hardener. The proportion of fluoropolymer present in the primer layer may be 0 to about 25 wt %, based on the combined weight of the polymer binder and inorganic film hardener.

The compositions used to form the inner layer and outer layer of the coating of the present invention and the primer layer, if present, are preferably in liquid form. This liquid form is preferably provided by using one or more organic solvents, within which the fluoropolymer is present as dispersed particles, usually submicrometer in size, and the polymer binder is present either as dispersed particles or preferably in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation. The solvent should have a boiling point of 50 to 200° C., so as not to be too volatile at room temperature, but to be vaporized at reasonable elevated temperatures, less than the baking temperature of the layer. Typically, the coating composition will contain about 40 to 75 wt % solvent based on the combined weight of solvent and solid components dispersed in the solvent, with any dissolved polymer binder being considered to be a dispersed solid in this calculation.

The primer layer, if present, contains polymer binder selected from those described above; and optionally one or more of the fluoropolymers described above. This layer may also contain one or more inorganic film hardeners selected from those described below The proportion of fluoropolymer present in the primer layer may be 0 to about 25 wt %, preferably about 3 to about 10 wt % based on the combined weight of the polymer binder and inorganic film hardener.

With respect to inorganic film hardener used in the primer layer for imparting increased abrasion resistance to the non-stick coating, examples of such inorganic film hardeners, sometimes called inorganic filler film hardeners, include inorganic oxides (ceramic compounds), carbides, borides and nitrides preferably having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850). The amount and particle size of the inorganic film hardener, if present in the coating, preferably in the primer layer, is that which is effective to increase the abrasion resistance of the coating formed from the composition preferably by at least 20% greater than the abrasion resistance of the coating, but without the presence of the particles of inorganic film hardener. More preferably, the inorganic film hardener particles are present in an effective amount to increase the abrasion resistance by at least 50%, and even more preferably by at least 100% as compared to the coating without the inorganic film hardener. Typically, the average particle size of the inorganic film hardener is at least about 10 µm and the amount of film hardener in the primer layer is preferably at least about 15 wt %, more preferably at least about 20 wt % and most preferably, at least about 25 wt %, based on the combined weight of polymer binder, fluoropolymer, if present, and inorganic film hardener. Typically, the average particle size of the inorganic film hardener will not exceed about 45 µm, and the maximum amounts of polymer binder and inorganic film hardener will not exceed, about 85 wt % and about 40 wt %, respectively, based on the combined weight of polymer binder and inorganic film hardener. The maximum amount of film hardener is limited by the constraints of the Autoclave Test and Acid Soak Tests. The amount of polymer binder and fluoropolymer, if present, is sufficient to form a continuous film upon baking, within which the dispersed particles of inorganic film hardener are embedded.

The inorganic film hardener that can be used in the inner layer as the particulate agent can be selected from those mentioned above. It is not necessary, however, that the inorganic film hardener used for this purpose has a high Knoop hardness. For example, $SiO_2$ or mica can be used as the particulate agent in the inner layer.

The polymer binder and fluoropolymer components of the inner layer and outer layer compositions are selected from these components described above. Typically, the weight ratio of polymer binder in the inner layer will be at least 0.9:1 based on the combined weight of polymer binder and fluoropolymer. The amount of polymer binder may even exceed the amount of fluoropolymer. Preferably the weight ratio of polymer binder to fluoropolymer in the inner layer is from about 75:25, more preferably from about 60:40, to about 25:75, to total 100 wt % based on the combined weight of the polymer binder and fluoropolymer. Preferably the amount of particulate agent in the inner layer is at least about 10 wt %, more preferably at least 15 wt %, based on the combined weight of polymer binder, fluoropolymer, and particulate agent, more preferably at least 20 wt % based on the aforesaid combined weight. .An amount greater than about 30 wt % is not desirable in that Tests performance tends to deteriorate. In one embodiment of inner layer, the proportion of polymer binder, fluoropolymer and particulate agent each exceeds 20 wt %, preferably at least 25 wt %, with the polymer binder and fluoropolymer constituting the remaining wt % to total 100% of the combined weight of these three components.

The weight % of fluoropolymer in the outer layer is preferably at least as great and more preferably, greater than in the inner layer, preferably at least 50% greater than in the inner layer, more preferably, at least 60% greater, and most preferably at least 75% greater. Thus, the weight ratio of polymer binder to fluoropolymer in the outer layer is preferably much lower than in the inner layer.

In one embodiment of the present invention, polytetrafluoroethylene (PTFE) micropowder is added to the outer layer in a small amount to improve surface gloss. PTFE micropowder is well known as a low enough molecular weight polytetrafluoroethylene, the molecular weight being low enough that the PTFE is melt flowable, but with virtually no physical strength. Whereas the fluoropolymers used in the inner and outer layers and optionally in the primer layer are melt-fabricable, e.g. extrudable into articles having sufficiently strength so as to be useful, the PTFE micropowder is not melt-fabricable, because its extruded shape is too brittle (weak) to have any practical utility. The PTFE micropowder, can be made by radiation degradation of high molecular eight non-melt flowable PTFE or by direct polymerization and if present in the outer layer, will generally be present in at least a 2 wt % amount and up to about 10 wt %, based on the total weight of the fluoropolymer in the outer layer. The PTFE micropowder is included in the fluoropolymer compositional amounts described above with respect to the outer layer. The PTFE micropowder can also be used in whole or in part of the fluoropolymer content of the primer layer in the amount disclosed above.

The primer layer, inner layer, and outer layers are applied in the liquid form, using one or more solvents described above to obtain the viscosity desired for the particular coating composition. The compositions can be applied from a nozzle at the end of a tube that retracts from the interior of the pipe being coated via sled elements as described in U.S. 2006/0017281 [0036]. The layer thickness can be obtained with a single coating pass through the pipe interior or multiple passes to obtain the thickness desired. One skilled in the art through viscosity control and dry solids content of the coating composition knows how to obtain the coating thickness desired. Between coating passes, the previously applied coating is either dried or baked before the next coating is applied. Preferably, the primer layer, inner layer and outer layer are each baked prior to application of the next layer. Baking of the coating means that is heated sufficiently above the melting temperature of the highest melting component of the coating in order to cause this material and lower melting components, if present, to flow and fuse together into a film-like layer. The thickness of the layer is determined after baking. It is preferred that each layer be formed by a single coating pass, wherein the resultant baked layer and thus the baked coating are free of pinholes and cracks. While PAI is a preferred polymer binder for use in the primer layer and the inner layer, it is preferred that the outer layer be free of this polymer binder. Thus the preferred polymer binder for the outer layer is PES, possibly in combination with another polymer binder such as polyphenylene sulfide.

More preferably the primer layer if present is at least 15 µm thick, even more preferably, at least 20 µm thick and most preferably at least 25 µm thick. If inorganic film hardener is present in the primer layer in such particle size that exceeds the thickness of the layer, i.e. portions of the particles extend from the baked surface of the layer, while still being covered by primer layer composition, the thickness of the primer layer can be determined by the eddy-current principle (ASTM B244) or by the magnetic induction principle (ASTM B499), otherwise the thickness of the primer layer can be determined by measuring a magnified cross-section of the layer. In one preferred embodiment the primer layer has a thickness of about 20 to about 30 µm.

At least one and preferably both the inner and outer layers have a thickness of at least about 25 μm and more preferably about 25 to about 60 μm. Preferably, the overall thickness of the non-stick coating, whether of inner and outer layers only, or of primer, inner and outer layers, is at least about 60 μm and most preferably, at least about 75 μm. In one embodiment the total coating thickness is no greater than about 125 μm.

The interior surface of an oil pipe, as manufactured, is generally smooth but with peaks and valleys and is generally coated with preservative to minimize any rusting. Before forming the nonstick coating on the pipe interior surface, such surface should be treated to remove the preservative and any other contaminant. This removing step is aimed at providing a clean adherent surface for the inner layer and outer layer to be adhered to the interior surface of the pipe, preferably using a primer layer to establish the rigorous bond needed between interior surface and between the primer layer and the subsequently applied inner layer and outer layer. Conventional soaps, solvents and cleansers can be used. The pipe can be further cleaned by baking at high temperatures in air, temperatures of 800° F. (427 ° C.) or greater. The cleaned interior surface can then be roughened, such as by chemical etching or grit blasted with abrasive particles, such as sand, metal shot, or aluminum oxide, to form a roughened surface to which the primer layer of the coating can adhere. The grit blasting is sufficient to remove any rust and scale that may be present, thereby supplementing the cleaning of the interior surface. The roughening that is desired for nonstick coating adhesion can be characterized as a roughness average, Ra, of at least about 100 microinches, more often at least about 125 microinches, preferably at least about 150 microinches, and more preferably at least about 175 microinches. In a one preferred embodiment, the roughness average, Ra, is about 150 to about 250 microinches. As roughness of the interior surface of the pipe is reduced below about 100 microinches, performance in the Autoclave Test deteriorates.

FIG. 1 shows a cross-section drawing of a pipe according to the invention wherein pipe 1 is provided with an inner layer 2 and an outer layer 3.

EXAMPLES

Test Methods
Adhesion Tests

Test panels of carbon steel 1.5"×6" (3.8 cm×15.2 cm) are cleaned with an acetone rinse. The panels have a grit blast surface and are coated according to the description in each of the Examples. The panels are subjected to the Autoclave Test and the Acid Soak Test described below for determining adhesion quality in two ways, the difficulty in removing the coating from the test panel after being exposed to the Tests and the degree of blistering within the coating arising from exposure to the Tests.

(1) Autoclave Test

Adhesion of the non-stick coating of this invention to the interior surface of a pipe is tested using the Autoclave Test on non-stick coated test panels described above. The Autoclave Test is conducted using a modification of NACE TM0185-06 "Evaluation of Internal Plastic Coatings for Corrosion Control of Tubular Goods by Autoclave Testing." Samples are prepared and suspended in a beaker where test fluids are added and then the beaker is placed into an autoclave unit. The unit is secured and gases are metered into the unit using partial pressures. The heat is turned on and the pressure is monitored until full temperature is reached. The panels are in this way suspended in an autoclave containing three phases: 1) an aqueous phase solution of NaCl, 2) a hydrocarbon phase; and 3) a gas phase according to the following test conditions and composition of the three phases:

| | |
|---|---|
| Temperature: | 163° C./325° F. |
| Pressure | 58.6 MPa/8500 psi |
| Aqueous: | 5% (w/w/) NaCl in Distilled Water |
| Hydrocarbon | Toluene/Kerosene @ 1:1 by Volume |
| Gas: | 16%, $H_2S$, 5% $CO_2$, 79% $CH_4$ |
| Duration: | 24 Hours |
| Decompression Rate: | From 8500 psi to 1500 psi (30 sec or 5 min) |
| | From 1500 psi to atm. Pressure (20 min) |

During pressurization and soaking under pressure, vapors from the above-mentioned gas and liquid media permeate into the coating and become the Test Vapor that exits the coating upon the depressurization next described. After twenty four (24) hours, the autoclave is depressurized at operating temperature. Depressurization from 8500 psi to 1500 psi is achieved in either 30 seconds or 5 minutes as described in the Examples below. This short time frame is used to simulate rapid decompression that might be experienced in actual field service in downhole pipe. Depressurization from 1500 psi to atmospheric pressure is done over twenty (20) minutes. The sample is removed and examined within one hour for blistering change and adhesion in accordance with NACE TM0185-06.

Blister size is rated by comparison with photographic standards in FIGS. 1-4 according to ASTM D714 using the scale:

Adhesion is evaluated by the parallel scribe method wherein the coating is scored to the metal in two parallel scribes approximately ⅛" (5 mm) apart. A knife blade in then inserted in one of the scribes in an attempt to lift the coating from the metal surface of the panel. The adhesion of each layer in the coating system is rated as follows:

A (8-10) The coating does not release from the layer below it. In the case of primer, it does not release from the metal substrate. The only bare metal visible is in the scribes.
B (6-7) Less than 50% of the coating layer below (or in the case of primer, the metal substrate) is visible between the scribes.
C (4-5) More than 50% of the coating layer below (or in the case of primer, the metal substrate 1) is visible between the scribes.
D (2-3) All coating releases from the layer below it between the scribes (or in the case of primer, the metal substrate) when probed with a blade, but remains adhered adjacent to the cuts made by the parallel scribes.
E (0-1) No bond exists between coating and the layer below it (or in the case of primer, the metal substrate metal). Once the film has been scribed, the coating releases.

(2) Acid Soak Test

Adhesion of the non-stick coating of this invention to the interior surface of a pipe is tested using the Acid Soak Test on the non-stick coated test panels described above. The Acid Soak Test is conducted in accordance with NACE 174 Procedure B specifications. The test consists of immersion of about 80% of the lengths of the coated panel samples in a 1-litre beaker containing either 20% hydrochloric acid or a stronger solution of 28% hydrochloric acid at 93° C./200° F. for either 4 hours or 24 hours as described in the examples below (Test Acid). After the test, the coated panels are removed and the coatings are examined within one hour after removal of the coated panels from the acid soak for blistering according to ASTM D714 and adhesion according to ASTM D6677.

Blister size is rated according to ASTM D714 using the same scale as listed above for the Autoclave Test.

Adhesion is evaluated wherein the coating is scored with a knife to the metal in an X-scribe approximately 1.5 inches (38.1 mm). A knife blade in then inserted in the scribed area where the scribes cross in an attempt to lift the coating from the metal surface of the panel. The adhesion is rated per ASTM D6677 as follows:

| Rating | |
|---|---|
| 10 | Coating is extremely difficult to remove; fragments no larger than approximately 0.6 by 0.8 mm removed with great difficulty. |
| 8 | Coating is difficult to remove; chips ranging from approximately 1.6 by 1.6 mm to 3.2 by 3.2 mm can be removed with difficulty. |
| 6 | Coating is somewhat difficult to remove; chips ranging from approximately 3.2 by 3.2 mm to 6.3 by 6.3 mm can be removed with slight difficulty. |
| 4 | Coating is somewhat difficult to remove; chips in excess of 6.3 by 6.3 mm can be removed by exerting light pressure with the knife blade.. |
| 2 | Coating is easily removed; once started with a knife blade, the coating can be grasped with ones fingers and easily peel to a I of at least 6.3 mm |
| 0 | Coating can be easily peeled from the substrate to a length greater than 6.3 mm. |

Abrasion Test
Mechanical Tiger Paw Abrasion Test (MTP)

A coated substrate is evaluated for abrasion resistance by continuously rotating three weighted ballpoint pen tips on the surface of the coated substrate while the substrate is heated and oscillated back and forth on a shaker table. The testing equipment used to perform the MTP Abrasion Test is shown and described in FIGS. 1, 2 and 3 of U.S. Pat. No. 6,761,964 to Tannenbaum.

In operation, a fry pan with a coated aluminum substrate is washed in mild detergent to remove any dirt or oil. A test pan is placed on a hot plate with the aid of a removable centering rod temporarily installed in central drive shaft. The centering rod acts a plumb line for pan placement on a surface of the hot plate after which the centering rod is removed. The test pan is subjected to the action of a tiger paw head. A tiger paw head is a disc with channels for housing three ballpoint pen refills that are free of damage prior to use. For each test, three new pen refills are installed in channels of the tiger paw head so that each refill extends downward ¾ inch (1.9 cm) from the bottom of a rotating disc. The tiger paw head is attached to a floating shaft that extends down from the drive disc attached to the drive shaft. The weight of the tiger paw head and floating shaft is regulated. In the equipment illustrated in U.S. Pat. No. 6,761,964, the weight is approximately 400 g. The combined weight of the floating shaft and washers (all approximately 115 g), the tiger paw head (approximately 279 g), and the ballpoint pen points (approximately 10 g) totals 404 g. The counterbalancing weight also totals approximately 400 g.

The hot plate is turned on and the test substrate (pan) is heated to a temperature of 400° F. +/−10° F. (204° C. +/−6° C.). When the pan reaches test temperature as determined by infrared temperature measurement on the substrate surface, the pen refills are lowered onto the pan and the equipment is activated to begin the shaker table oscillation and tiger paw head rotation. In this way, the testing equipment rotates the pens against and around the surface of the coated substrate. The speed of tiger paw head rotation is controlled at 30 rotations per minute. The speed of the shaker table is controlled for 30 back and forth oscillations per minute. A counter records the number of cycles completed. A timer counts down each 15 minute period of tiger paw rotation in a particular direction. Data is recorded at 15-minute intervals. The rotation of the tiger paw head is reversed after each 15-minute period. Periodically the pen refill points are inspected for build-up of coating. Built-up coating is removed as necessary.

Failure of the coating on the substrate (pan) is monitored by observing the oval-shaped paths that evolve as the points of the pen refills penetrate through the coating to reach the bare metal substrate. By heating the substrate, the time to failure is accelerated. The longer the time to failure, the better the durability of the non-stick coating.

At the end of each 15-minute cycle, the pan is evaluated according to the following MTP numerical ratings:

| | |
|---|---|
| 10 | New Pan |
| 9 | Grooves in coating |
| 8 | First nick to metal (for on smooth substrates) Roughening of surface (for grit blasted substrates) |
| 7 | Lines to metal (outside and/or inside) |
| 6 | Oval beginning outside |
| 5 | Oval complete |

Rating Methodology

The non-stick coating is considered to pass both the Autoclave Test and the Acid Soak Test if the blister and adhesion ratings are at least 6 under the following test conditions:

| | Decompression | Acid Soak Condition | |
|---|---|---|---|
| | time (min) | 20% acid | 28% acid |
| Level 1 | 5 | 4 hr | |
| Level 2 | 5 | 24 hr | |
| Level 3 | 0.5 | 24 hr | |
| Level 4 | 0.5 | | 4 hr |
| Level 5 | 0.5 | | 24 hr |

To explain this table by reference to the non-stick coating passing the Autoclave Test and Acid Soak Test, Level 1, such non-stick coating exhibits a blister and adhesion rating of at least 6 when the decompression time in the Autoclave Test is 5 min and the acid concentration and soak time are 20 wt % and 4 hr, respectively. Passing these Tests, Level 4, means that the non-stick coating exhibits a blister and adhesion rating of at least 6 under the more severe conditions used in the conduct of the Autoclave Test and the Acid Soak Test as shown in the table. In proceeding from Level 1 to Level 5 as the passing Level, the severity of the test conditions are generally increasing, although the severity of the Level 3 and 4 conditions are similar. The performance of the non-stick coating in the order of increasing severity of test conditions, is the coating preferably passes Level 2, more preferably Levels 3 or 4 and most preferably passes Level 5, obtaining a blister and adhesion rating of at least 6 at the Level being tested. A non-stick coating that passes more severe Test conditions, e.g. Level 4, will also pass the less severe Test conditions, e.g. Levels 1 and 2.

DRY FILM THICKNESS (DFT). The dried coating film thickness (DFT) for primer/midcoat/overcoat is measured using magnetic instruments as described in ASTM D1186. This method is equivalent to the eddy current method (ASTM B244) applicable to non-magnetic substrates, i.e., the results of the ASTM D1186 and B244 methods are comparable.

PARTICLE SIZE MEASUREMENT. The particle sizes disclosed herein, such as for the fluoropolymer particles, the particles of film hardener, particulate agent are number average particle sizes determined by the laser diffraction method in accordance with ISO 13320-1:1999.

General Procedure

In the Examples 1-5, Comparative Example 1, substrates (test panels described above) for coating are cleaned by baking 30 min @ 800° F. (427° C.) and grit blasted with 24 grit aluminum oxide to a roughness of approximately 200 microinches Ra. Liquid compositions to form the non-stick coating on these test panels are applied by using a spray gun, Model Number MSA-510 available from DeVilbiss located in Glendale Heights, Ill.

The inner (primer) layers formed in the Examples have the following pre-bake compositions:

TABLE 1

Layer Coatings - Primers

|  | 1 wt % | 2 wt % | 3 wt % |
|---|---|---|---|
| Fluoropolymer |  |  |  |
| FEP-1 |  |  | 12.5 |
| PTFE |  | 1.38 |  |
| Polymer binder |  |  |  |
| Polyamideimide | 5.13 | 5.06 | 1.1 |
| Polyethersulfone | 12.41 | 12.24 | 7.6 |
| Filler |  |  |  |
| SiC (20 microns) | 8.97 | 8.87 |  |
| NMP* | 47.71 | 47.04 | 47.8 |
| Other Organics** | 23.98 | 23.65 | 20.1 |
| Water | 0.04 | 0.04 |  |
| Pigments |  |  | 9.9 |
| Dispersing Agent | 2.06 | 1.72 | 1.0 |
| Total | 100 | 100 | 100 |
| Solids wt % | 27.25 | 26.9 |  |
| Based on Dry Film |  |  |  |
| Binder wt % | 64.37 | 64.31 |  |
| FP wt % | 0 | 5.13 |  |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
Polyamideimide is PD10629 supplied by REA Wire. It is a 33 wt % solution in aromatic solvent, which is primarily NMP.
Polyether sulfone is available under the trade name Ultrason E ® from BASF Silicon Carbide has a particle size of about 20 micrometers and is available from Elektroschmelzwerk Kempten GmbH (ESK), Munich Germany
FEP 1: TFE/HFP fluoropolymer containing 11-12.5 wt % HFP, an average particle size of 8-28 microns and a melt flow rate of 6.8-7.8 g/10 min measured at 372° C. by the method of ASTM D-1238 using the 5 kg wt.
PTFE: Zonyl ® Fluoroadditive grade MP-1000 (micropowder) available from the DuPont Company, Wilmingotn, DE.

The coatings formed on top of the primer layer in the Examples have the following pre-bake compositions:

TABLE 2A

Inner and Outer Layer Coating Compositions

| Ingredient | 1 inner (mid) wt % | 2 outer (top) w % | 3 inner (mid) wt % | 4 inner (mid) wt % | 5 inner (mid) wt % | 6 outer (top) wt % |
|---|---|---|---|---|---|---|
| Fluoropolymer |  |  |  |  |  |  |
| FEP-1 | 13.44 | 16.78 | 8.13 | 11.32 | 12.96 |  |
| PTFE |  | 2.1 |  |  |  |  |
| FEP-2 |  |  |  |  |  | 45.3 |
| Polymer binder |  |  |  |  |  |  |
| Polyamideimide | 3.93 | 2.88 | 5.26 | 5.66 | 6.48 |  |
| Polyethersulfone | 9.51 | 6.66 | 12.73 | 5.66 | 6.49 |  |
| NMP | 41.54 | 47.47 | 48.18 | 45.24 | 47.31 |  |
| Other Organics | 22.02 | 24.04 | 25.63 | 24.07 | 25.24 | 15.3 |
| Water | 0.03 | 0.04 | 0.04 | 0.04 | 0.04 | 34.90 |
| Pigments | 8.98 |  |  | 7.53 | 1.37 |  |
| Dispersing Agent | 0.55 | 0.03 | 0.03 | 0.48 | 0.12 | 4.5 |
| Total | 100 | 100 | 100 | 100 | 100 | 100 |
| Solids wt % | 36.22 | 28.42 | 26.12 | 30.47 | 27.35 | 45.3 |
| Based on Dry Film |  |  |  |  |  |  |
| Binder wt % | 37.11 | 33.57 | 68.87 | 37.15 | 47.42 |  |
| FP wt % | 37.11 | 66.43 | 31.13 | 37.15 | 47.39 | 100 |
| Pigment wt % | 24.79 | 0 | 0 | 24.71 | 5.01 | 0 |

Pigment is ultramarine blue 16 (Holliday Pigments) - sodium alumino sulpho silicate
Polyamideimide is PD10629 supplied by REA Wire. It is a 33 wt % solution in aromatic solvent, which is primarily NMP.
Polyether sulfone is available under the trade name Ultrason E ® from BASF
FEP 1: TFE/HFP fluoropolymer containing 11-12.5 wt % HFP, an average particle size of 8-28 microns and a melt flow rate of 6.8-7.8 g/10 min measured at 372° C. by the method of ASTM D-1238 using the 5 Kg weight.
FEP 2 dispersion: TFE/HFP fluoropolymer dispersion containing 11-12.5 wt % HFP, an average particle size of approximately 200 nanometers in water and surfactant with an average solids content of 60%. The solid fluoropolymer has a melt flow rate of 6.8-7.8 g/10 min measured at 372° C. by the method of ASTM D-1238 using the 5 kg weight.
PTFE: Zonyl ® Fluoroadditive grade MP-1600 (micropowder) available from the DuPont Company, Wilmington, DE.

TABLE 2B

Inner and Outer Layer Coating Compositions

|  | 7 (mid) wt % | 8 (top) wt % |
|---|---|---|
| Fluoropolymer |  |  |
| PFA-1 |  | 45.0 |
| PFA-2 | 41.2 |  |
| Polymer binder |  |  |
| Polyamideimide | — | — |
| Polyethersulfone | — | — |
| Organics | 10.53 | 10.75 |
| Water | 42.84 | 43.8 |
| Pigments | 5.02 | — |
| Dispersing Agent | 0.41 | 0.45 |
| Total | 100 | 100 |
| Solids wt % | 46.53 | 45.85 |

TABLE 2B-continued

Inner and Outer Layer Coating Compositions

|  | 7 (mid) wt % | 8 (top) wt % |
|---|---|---|
| Based on Dry Film |  |  |
| Binder wt % | — | — |
| FP wt % | 89.1 | 100 |
| Pigment wt % | 10.9 | — |

Pigment is ultramarine blue 16 (Holliday Pigments)
Polyamideimide is PD10629 supplied by REA Wire. It is a 33 wt % solution in aromatic solvent, which is primarily NMP
Polyether sulfone is available under the trade name Ultrason E ® from BASF
PFA1: TFE/PPVE fluoropolymer containing 3.2-4.1 wt % PPVE, an average powder size of 28.9-40.5 microns and a melt flow rate of 4.1-5.9 g/10 min measured at 372° C. by the method of ASTM D-1238 using the 5 kg weight.
PFA2: TFE/PPVE fluoropolymer containing 3.2-4.1 wt % PPVE, an average powder size of 60-100 microns and a melt flow rate of 1.7-2.1 g/10 min measured at 372° C. by the method of ASTM D-1238 using the 5 kg weight.

Example 1

A layer of primer 1 containing polymer binder and no fluoropolymer is applied to a set of prepared carbon steel panels, followed by baking at 550° F. (288° C.) for 10 minutes. The dry film thickness (DFT) of the primer layer is 0.91 mil (22.7 um).

An inner layer coating 1, containing about 25% pigment and having a FP/binder ratio of about 50/50, is applied over the baked primer layer. The inner layer (midcoat) is baked at 700° F. (371° C.) for 20 minutes. The DFT of the resultant inner layer is 1.6 mil (40 um). An outer layer coating (topcoat) 2 is applied to the baked inner layer. The outer layer is baked at 700° F. (371° C.) for 20 minutes. The DFT of the baked outer layer is 1.92 mil (48 um). The total DFT of the three coat system is 4.43 mil (111 um) and the combined thickness of the inner and outer layers is 3.52 mil (88 um).

Coated panels are subjected to the Autoclave Test to test adhesion of the nonstick coat to the metal substrate as described in the Test Methods above Test conditions and the results of Autoclave and Acid Soak Tests performed on these coated panels are presented in Table 3. Panels with this coating system have superior adhesion to metal substrates in both the Autoclave Test and the Acid Soak Test. The Autoclave Test indicates very good intercoat adhesion (i.e., adhesion between the top and the midcoat, adhesion between the midcoat and primer) as well as excellent adhesion to the metal substrate (i.e, primer adhesion). Panels in both tests have very good blister ratings, i.e., very small (microscopic) blisters. The non-stick coating of this Example passes the Level 3 Test conditions and Level 5 Test conditions.

Example 2

Similar to Example 1, but using primer 2 containing polymer binder and 5% PTFE micropowder, applied to a set of prepared carbon steel panels, followed by baking in the range of 650° F.-700° F. (343-371° C.) for 10 minutes. The dry film thickness (DFT) of the primer layer is 1.07 mil (27 um).

The same inner and outer layer coating compositions used in Example 1 are applied using the same baking conditions. The DFT of the inner layer is 1.74 mil (43.5 um). The DFT of the outer layer is 1.61 mil (40 um). The total DFT of the three coat system is 4.42 mil (110.5 um) and the combined thickness of the inner and outer layers is 3.35 mil (84 um).

Coated panels are subjected to both the Autoclave Test and the Acid Soak Test. Test conditions and results are presented in Table 3. Panels with this coating system have very good intercoat adhesion as well as good adhesion to the metal substrates with very good blister ratings. The non-stick coating of this Example passes the Level 3 Test conditions and Level 5 Test conditions.

Example 3

No Pigment in Inner Layer

A layer of primer 2 containing polymer binder and 5% PTFE micropowder is applied to a set of prepared carbon steel panels, followed by baking at 650° F. (343° C.) for 10 minutes. The dry film thickness (DFT) of the primer layer is 0.83 mil (21 um).

Inner layer coating 3, containing no pigment and having a FP/binder ratio of about 30/70, is applied over the baked primer layer and is baked at 700° F. (371° C.) for 20 minutes. The DFT of the inner layer is 1.55 mil (39 um). Outer layer coating 2 is applied and is baked at 700° F. (371° C.) for 20 minutes. The DFT of the outer layer is 1.6 mil (40 um). The total DFT of the three coat system is 4.02 mil (100.5 um) and the combined thickness of the inner and outer layers is 3.19 mil (80 um).

Coated panels are subjected to both the Autoclave Test and the Acid Soak Test. Test conditions and results are presented in Table 3. Panels with this coating system have very good intercoat adhesion as well as excellent adhesion to the metal substrates with good blister ratings. The non-stick coating of this Example passes the Level 3 Test condition for the Autoclave Test and would be expected to at least pass the Acid Soak Test conducted at the Level 1 condition, whereby this coating would be considered to at least pass the Level 1 Test conditions.

Example 4

25% Pigment in Inner Layer

A layer of primer 2 containing polymer binder and 5% PTFE micropowder is applied to a set of prepared carbon steel panels, followed by baking at 700° F. (371° C.) for 10 minutes. The dry film thickness (DFT) of the primer layer is 1.08 mil (27 um).

An inner layer coating 4, containing about 25% pigment and having a FP/binder ratio of about 50/50, is applied over the baked primer layer and is baked at 700° F. (371° C.) for 20 minutes. The DFT of the inner layer is 1.62 mil (40.5 um). An outer layer coating 2 is applied to the baked inner layerand is baked at 700° F. (371° C.) for 20 minutes. The DFT of the outer layer is 1.49 mil (37 um). The total DFT of the three coat system is 4.19 mil (105 um) and the combined thickness of the inner and outer layers is 3.11 mil (78 um).

Coated panels are subjected to both the Autoclave Test and the Acid Soak Test). Test conditions and results are presented in Table 3. Panels with this coating system have good to excellent adhesion to metal substrate with good blister ratings. The non-stick coating of this Example passes the Level 4 Test conditions.

Example 5

5% Pigment in Inner Layer

A layer of primer 2 containing polymer binder and 5% PTFE micropowder is applied to a set of prepared carbon steel panels, followed by baking at 700° F. (371° C.) for 10 minutes. The dry film thickness (DFT) of the primer layer is 1.01 mil (25 um).

An inner layer coating 5, containing about 5% pigment and having a FP/binder ratio of about 50/50, is applied over the baked primer layer and is baked at 700° F. (371° C.) for 20 minutes. The DFT of the inner layer is 3.06 mil (76.5 um). An outer layer coating 2 is applied and is baked at 700° F. (371° C.) for 20 minutes. The DFT of the outer layer is 0.93 mil (23 um). The total DFT of the three coat system is 5 mil (125 um) and the combined thickness of the inner and outer layers is 3.99 mil (100 um). Coated panels are subjected to both the Autoclave Test and the Acid Soak Test). Test conditions and results are presented in Table 3. Panels with this coating system have good to excellent adhesion to metal substrate with good blister ratings. The non-stick coating of this Example passes the Level 4 Test conditions.

Comparative Example 1

100% FP Topcoat

Similar to Example 1, using primer 1 containing polymer binder and no fluoropolymer, the primer layer is applied to a set of prepared carbon steel panels, followed by by baking at 550° F. (288° C.) for 10 minutes. The dry film thickness (DFT) of the primer layer is 0.9 mil (23 um).

An inner layer coating 4, containing about 25% pigment and having a FP/binder ratio of about 50/50, is applied over the baked primer layer and is baked at 700° F. (371° C.) for 20 minutes. The DFT of the inner layer is 2.0 mil (50 um). An outer layer coating 6 which contains no polymer binder, only fluoropolymer, is applied to the baked inner layer and is baked at 700° F. (371° C.) for 20 minutes. The DFT of the outer layer is 2.11 (53 um). The total DFT of the three coat system is 5 mil (125 um) and the combined thickness of the inner and outer layers is 4.11 mil (103 um).

Coated panels are subjected to both the Autoclave Test and the Acid Soak Test. Test conditions and results are reported in Table 3. Although panels with this coating system, show excellent adhesion and blister rating after the Acid Soak, coated panels have extremely poor intercoat adhesion and poor metal adhesion in the gas and water phases of the Autoclave Test as well as very poor blister ratings in all phases. The non-stick coating of this Comparative Example does not pass the Level 1 Test conditions.

TABLE 3

SUMMARY OF ADHESION TEST RESULTS

| | Examples | | | | | |
|---|---|---|---|---|---|---|
| | 1 | 2 | 3 | 4 | 5 | C-1 |
| Top-FP/Binder | 70/30 | 70/30 | 70/30 | 70/30 | 70/30 | 100/0 |
| Mid-FP/Binder | 50/50 | 50/50 | 30/70 | 50/50 | 50/50 | 50/50 |
| % Pigment | 25% | 25% | 0% | 25% | 5% | 25% |
| Top DFT (μm) | 48 | 40 | 40 | 37 | 23 | 53 |
| Mid DFT (μm) | 40 | 43.5 | 39 | 40.5 | 76.5 | 2.11 |
| Total DFT (μm) | 111 | 110.5 | 100 | 104.5 | 125.5 | 126 |
| Primer with 5% PTFE | No | Yes | Yes | Yes | Yes | No |
| Primer Bake, ° F. | 550 | 700-650 | 650 | 700 | 700 | 700 |

AUTOCLAVE TEST

| | Decompression Time | | | | | |
|---|---|---|---|---|---|---|
| | 0.5 Min. | 0.5 Min. | 0.5 Min. | 0.5 Min. | 0.5 Min. | 5 Min. |
| GAS | | | | | | |
| Top Adhesion | 7 | 6 | 9 | — | — | 3 |
| Mid Adhesion | 8 | 9 | 7 | — | — | 3 |
| Primer Adhesion | 8 | 9 | 9 | 7 | 9 | 5 |
| Blister Size | 8 | 8 | 6 | 6 | 6 | 2 |
| HC | | | | | | |
| Top Adhesion | 7 | 6 | 9 | — | — | 6 |
| Mid Adhesion | 9 | 8 | 7 | — | — | 6 |
| Primer Adhesion | 9 | 8 | 9 | 7 | 9 | 8 |
| Blister Size | 8 | 8 | 6 | 6 | 6 | 2 |
| Water | | | | | | |
| Top Adhesion | 7 | 6 | 9 | — | — | 4 |
| Mid Adhesion | 8 | 8 | 7 | — | — | 4 |
| Primer Adhesion | 8 | 8 | 9 | 7 | 7 | 2 |

ACID SOAK TEST

| | | | | | | |
|---|---|---|---|---|---|---|
| Acid Soak 28%, 200 F., | 24 Hrs | 24 Hrs | — | 4 Hrs | 4 Hrs | 4 Hrs |
| Acid Adhesion | | 6 | 6 | | 10 | 8 | 10 |
| Acid Blister Size | | 10 | 8 | | 8 | 8 | 10 |
| Acid Soak 20%, 200 F., | 24 Hrs | 24 Hrs | | | | |
| Acid Adhesion | | 8 | 10 | | | | |
| Acid Blister Size | | 8 | 8 | | | | |

Example 6

Abrasion Test

The coating system of Example 4 is compared to three prior art systems to demonstrate the superior abrasion resistance of the present invention using the MTP Abrasion Test as described in the Test Methods above.

The coating system of Example 4 having a primer which contains SiC particles is compared with (a) a standard epoxy powder coating, Comparative Example A of US 2006/0017281A1; (b) a standard commercial one coat composition containing red pigment, polyethylene sulfone, fluorinated ethylene propylene resin and various solvents as and (c) a commercial corrosion resistant coating system applied in a similar manner as Example 4, having a primer layer 3 without SiC particles, a midcoat layer 7 containing mica for a midcoat, and a top coat layer 6.

The coating systems are applied onto test pans which surfaces have been cleaned and grit blast. DFT's for the coating layers are listed in Table 4. Test pans are subjected to MTP Abrasion Test as described under the test methods to evaluate abrasion resistance. Test conditions and results are listed in Table 5. While the Finish ratings of the test pans appear similar, the short time for comparative systems (a), (b), and (c) to reach this rating compared to the 420 minutes of Example 4 indicates the inferior abrasion resistance of the comparative coatings.

TABLE 4

MTP Sample Preparation

| Pans | Primer | Primer Dft | Midcoat | Mid Dft | Topcoat | Top Dft |
|---|---|---|---|---|---|---|
| Ex 4 | Primer 2 | 1.27 mil (31.8 um) | Inner Layer 4 | 1.08 mil (27 um) | Outer Layer 2 | 1.43 mil (35.8 um) |
| (a) Epoxy One Coat | — | | — | | | 3.7 mil (92.5 um) |
| (b) FP/Binder One Coat | — | | — | | — | 1.7 mil (42.5 um) |
| (c) Corrosion Resistant Coating | Primer 3 | 1.29 mil (32.3 um) | Midcoat Layer 7 | 2.65 mil (66.3 um) | Topcoat Layer 8 | 1.8 mil (45 um) |

TABLE 5

MTP Test Results

| Pan# | Start time | Start temp (° F.) | Rating | Finish time | Finish temp (° F.) | Finish rating |
|---|---|---|---|---|---|---|
| Ex 4 | 15 min | 390 | 9 | 420 min | 420 | 6 |
| (a) Epoxy One coat | 15 min | 390 | 8 | 25 min | 400 | 5 |
| (b) FP/Binder One coat | 15 min | 390 | 9 | 165 min | 400 | 5 |
| (c) Corrosion Resistant Coating | 15 min | 390 | 9 | 35 min | 401 | 7 |

Example 7

A series of substrates are prepared as described under the GENERAL PROCEDURE and coating of primer layer, inner layer, and outer layer are carried out as described in Example 1, except that the substrate is grit blasted to a surface roughness of 120-150 microinches. The first coating forms baked primer layer 1 on the substrate. The next coating is of inner layer 1 applied to the baked primer coating and then baked to obtain the same layer thickness as disclosed in Example 1. The outer layer compositions are as follows:

TABLE 6

Outer Layer Compositions

| | 7A | 7B | 7C |
|---|---|---|---|
| Fluoropolymer | | | |
| FEP-1 | 14.78 | 14.78 | 11.00 |
| PTFE | 1.86 | 1.86 | 1.38 |
| Polymer Binder | | | |
| PAI | — | — | — |
| PES | 7.39 | 11.09 | 8.12 |
| PPS | 3.70 | — | 4.26 |
| NMP | 40.82 | 40.82 | 43.71 |
| other organics | 30.60 | 30.60 | 30.65 |
| water | 0.05 | 0.05 | 0.05 |
| Carbon black | 0.27 | 0.27 | 0.28 |
| dispersing agent | 0.53 | 0.53 | 0.55 |
| Total | 100 | 100 | 100 |
| Based on Dry Film | | | |
| Binder wt % | 39.61 | 39.61 | 49.44 |
| FP wt % | 59.43 | 59.43 | 49.44 |
| Carbon black wt % | 0.96 | 0.96 | 1.12 |

The coating thickness for the baked outer layer formed from each of these compositions is 25-30 micrometers thick. Each of the coated substrates passed the Acid Soak and Autoclave Tests, level 4

The invention claimed is:

1. Pipe having a non-stick coating adhered to its interior surface, said coating being at least about 50 µm thick and comprising at least two layers constituting an inner layer and an outer layer adhered to one another, each said layers containing polymer binder and fluoropolymer and each being at least about 15 µm thick, wherein the weight ratio of said polymer binder to said fluoropolymer in said inner layer is from about 80:20 to about 25:75 and in said outer layer is from about 60:40 to about 15:85 and being effective to enable said non-stick coating to pass both the Autoclave Test and the Acid Soak Test, Level 1.

2. The pipe of claim 1 wherein said non-stick coating includes a primer layer between said inner layer and said interior surface and adhered to both said interior surface and said inner layer.

3. The pipe of claim 1 wherein said primer layer comprises polymer binder and optionally, one or more of fluoropolymer and inorganic film hardener.

4. The pipe of claim 3 wherein said primer layer contains inorganic film hardener having an average particle size that is effective to increase the abrasion resistance of said coating.

5. The pipe of claim 2 wherein said primer layer is at least about 10 μm thick.

6. The pipe of claim 1 wherein said inner layer contains a particulate agent effective to improve the performance of said non-stick coating in said Autoclave Test.

7. The pipe of claim 6 wherein said agent constitutes about 3 to about 30 wt % of the combined weight of agent, polymer binder, and fluoropolymer in the inner layer.

8. The pipe of claim 6 wherein said agent constitutes at least about 25 wt % of the weight of said fluoropolymer in said inner layer.

9. The pipe of claim 6 wherein said agent comprises pigment.

10. The pipe of claim 1 wherein at least 80 wt % of said fluoropolymer in said inner layer and said outer layer is tetrafluoroethylene/hexafluoropropylene copolymer.

11. The pipe of claim 10 wherein said fluoropolymer in said outer layer comprises at least 2 wt % of polytetrafluoroethylene micropowder, based on the total weight of said fluoropolymer in said outer layer.

12. The pipe of claim 1 wherein the weight of said polymer binder is said outer layer is within about 20% of the weight of said polymer binder in said inner layer and the weight of said fluoropolymer in said outer layer is at least about 20% greater than the weight of said fluoropolymer in said inner layer.

13. The pipe of claim 1 as downhole pipe.

14. Pipe having a non-stick coating adhered to its interior surface, said coating being at least about 50 μm thick and comprising at least two layers constituting an inner layer and an outer layer adhered to one another, each said layers containing polymer binder and fluoropolymner and being at least about 15 μm thick, the weight ratio of said polymer binder to said fluoropolymer in said inner layer being greater than the weight ratio of said polymer binder to said fluoropolymner in said outer layer and being effective to enable said non-stick coating to pass both the Autoclave Test and the Acid Soak Test, Level 1.

15. The pipe of claim 14 wherein said non-stick coating includes a primer layer between said inner layer and said interior surface and adhered to both said interior surface and said inner layer.

16. The pipe of claim 3 wherein said primer layer contains at least about 30 wt % of polymer binder and the polymer binder content of each said inner and outer layers is at least about 15 wt %.

17. Process for forming a non-stick coating adhered to the interior surface of pipe that is capable of passing both the Autoclave Test and the Acid Soak Test, Level 1, comprising:
optionally forming a primer layer on said interior surface,
sequentially forming at least two layers on said primer layer if present or to said interior surface if said primer layer is not present, said two layers constituting aninner layer and an outer layer adhered to one another, each said inner and outer layers containing polymer binder and fluoropolymer and being at least about 15 μm micrometers thick, the weight ratio of said polymer binder to said fluoropolymer in said inner layer is from about 80:20 to about 25:75 and in said outer layer is from about 60:40 to about 15:85 and being effective to enable said passing of said Tests.

18. The process of claim 17 and forming said primer layer on said interior surface to adhere to said interior surface and said inner layer.

19. The process of claim 17, wherein each of said inner and outer layers, and said primer layer when present, is formed by single pass coating.

20. The process of claim 17, wherein said polymer binder in said outer layer comprises polyether sulfone, and optionally, polyphenylene sulfide.

* * * * *